US012701287B2

(12) United States Patent
Casassovici

(10) Patent No.: US 12,701,287 B2
(45) Date of Patent: Aug. 4, 2026

(54) REAL-TIME INTERACTIVE PLATFORM FOR LIVE STREAMS

(71) Applicant: Alexander Casassovici, San Francisco, CA (US)

(72) Inventor: Alexander Casassovici, San Francisco, CA (US)

( * ) Notice: Subject to any disclaimer, the term of this patent is extended or adjusted under 35 U.S.C. 154(b) by 315 days.

(21) Appl. No.: 18/492,272

(22) Filed: Oct. 23, 2023

(65) Prior Publication Data

US 2024/0048795 A1 Feb. 8, 2024

Related U.S. Application Data

(63) Continuation-in-part of application No. 17/470,599, filed on Sep. 9, 2021, now abandoned.

(60) Provisional application No. 63/076,660, filed on Sep. 10, 2020.

(51) Int. Cl.
| | |
|---|---|
| *H04N 21/431* | (2011.01) |
| *A63F 13/86* | (2014.01) |
| *H04L 9/00* | (2022.01) |
| *H04N 21/2187* | (2011.01) |

(52) U.S. Cl.
CPC .......... *H04N 21/431* (2013.01); *A63F 13/86* (2014.09); *H04L 9/50* (2022.05); *H04N 21/2187* (2013.01)

(58) Field of Classification Search
CPC ... A63F 13/355; A63F 13/86; H04N 21/2187; H04N 21/6125
See application file for complete search history.

(56) References Cited

U.S. PATENT DOCUMENTS

| | | | |
|---|---|---|---|
| 2014/0195675 A1* | 7/2014 | Silver ..................... | H04L 67/02 |
| | | | 709/224 |
| 2016/0006817 A1* | 1/2016 | Mitic ...................... | H04L 65/65 |
| | | | 709/232 |
| 2016/0286244 A1* | 9/2016 | Chang ................ | H04N 21/4788 |
| 2020/0391122 A1* | 12/2020 | Hamilton ............ | A63F 13/5252 |
| 2021/0001236 A1* | 1/2021 | Srinivasan ............ | G07F 17/326 |
| 2021/0052988 A1* | 2/2021 | Fear ................. | H04N 21/25875 |
| 2021/0065516 A1* | 3/2021 | Warren .............. | G07F 17/3272 |
| 2021/0264735 A1* | 8/2021 | Joao ..................... | G07F 17/3241 |
| 2021/0327216 A1* | 10/2021 | Naramore ........... | G07F 17/3288 |
| 2022/0086511 A1* | 3/2022 | Laakkonen ......... | G07F 17/3225 |

* cited by examiner

*Primary Examiner* — Dmitry Suhol
*Assistant Examiner* — Ankit B Doshi
(74) *Attorney, Agent, or Firm* — My Patent Guys; Christopher Pilling; Colton Bangs

(57) ABSTRACT

A method for providing a real-time interactive platform for live streams is provided. The method includes providing a server having a hardware processor connected to a data repository, the server configured to host an overlay extension for a live stream via the Internet providing the real-time interactive platform for a plurality of users. The method further provides a data collector within an oracle, wherein the oracle is configured to interface the live stream to obtain statistics from the live stream. The method further generates timestamped events, via the data collector, wherein the events described what is occurring on the live stream in real-time. Finally, the method turns the events into gameplay interactions, via a game logic algorithm, for the plurality of users.

13 Claims, 10 Drawing Sheets

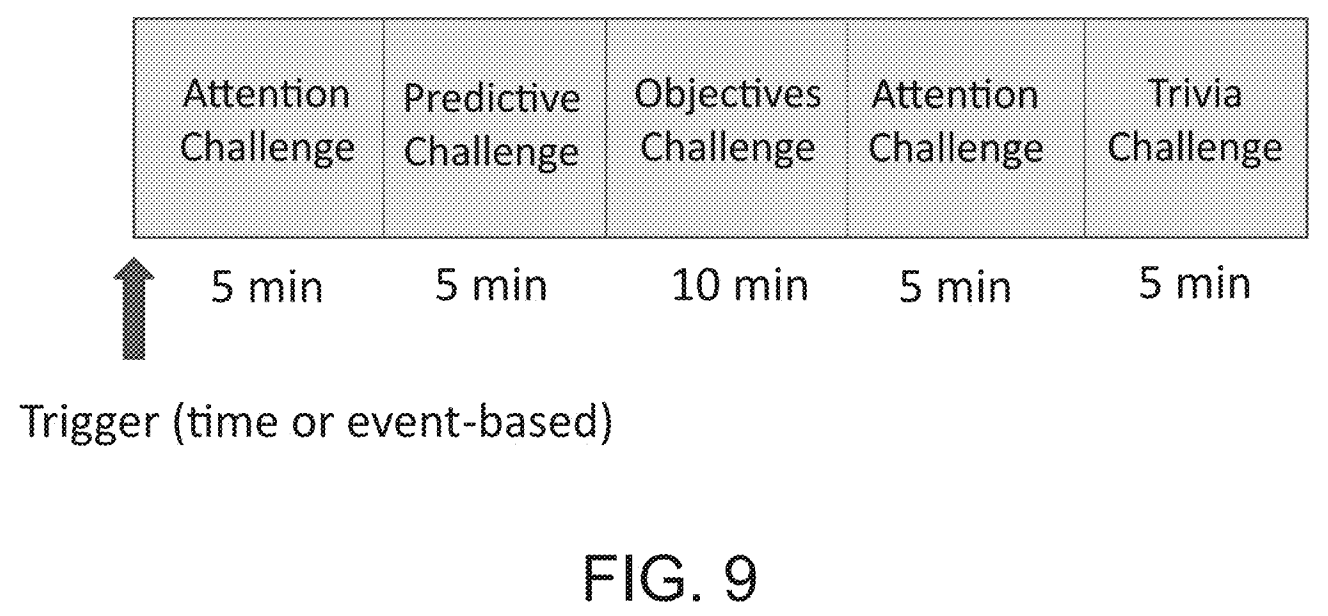

| Attention Challenge | Predictive Challenge | Objectives Challenge | Attention Challenge | Trivia Challenge |
|---|---|---|---|---|
| 5 min | 5 min | 10 min | 5 min | 5 min |

Trigger (time or event-based)

FIG. 9

REAL-TIME INTERACTIVE PLATFORM FOR LIVE STREAMS

CROSS-REFERENCE TO RELATED APPLICATIONS

The present application in a continuation in part application of Ser. No. 17/470,599 filed Sep. 9, 2021 which claims priority to provisional application 63/076,660, filed on Sep. 10, 2020 entitled "Automated and adaptive challenge generation and operation for streamed games", the disclosure of which is hereby incorporated in its entirety at least by reference.

BACKGROUND OF THE INVENTION

1. Field of the Invention

The present invention relates interactive competitions but more particularly to a real-time interactive platform for live streams.

2. Description of Related Art

Live streams are broadcasted over the Internet and may be in the form of live sports, competitive video games, or other events. Traditional live sports, such as basketball, baseball, soccer, boxing, etc. are known sporting events that bring millions of fans to watch. Competitive video games are no longer a niche sector of hardcore hobbyists but the fastest growing form of sports entertainment today. The category of eSports has converged around well-known garners, teams, leagues, franchises and sponsors reaching billions in revenues playing to sold-out arenas with a global audience in the hundreds of millions.

Live game streams have become a very popular way for amateurs to participate, allowing players to connect to fellow players, compete and learn/share new tricks for their favorite games. This has led to the category of content creators, such as garners who stream their play, build an audience of followers, communicate with their fans, sponsor brands and earn money in the process. Each day, hundreds of thousands of creators stream their play to millions of viewers around the globe. In the past few years, the hours of game content streamed on YouTube and Twitch exceed those of popular video streaming services.

Game designers often include "challenges" in the game design to influence the gamer's play and presumably provide additional excitement to the gaming experience for both watchers and garners. However, such challenges are usually built around static parameters, and not connected to individual gamers' behavior, abilities and gaming history. Such challenges, if taken up at all, are done so only sporadically and opportunistically. Consequently, a real-time interactive platform for live streams is needed.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a method for providing a real-time interactive platform for live streams is provided, the method comprising steps: (a) providing a server having a hardware processor connected to a data repository, the server configured to host an overlay extension for a live stream via the Internet providing the real-time interactive platform for a plurality of users; (b) providing a data collector within an oracle, wherein the oracle is configured to interface the live stream to obtain statistics from the live stream; (c) generating timestamped events, via the data collector, wherein the events described what is occurring on the live stream in real-time; and, (d) turning the events into gameplay interactions, via a game logic algorithm, for the plurality of users.

In one embodiment, the plurality of users are end users on the interactive platform including players and creators. In another embodiment, in step (d), a challenge enabler creates one or more challenges within the context of the live stream based on real-time information from the live stream captured by the oracle. In yet another embodiment, the challenge enabler further schedules the one or more challenges, invites the players to participate in the one or more challenges, monitors for data that can resolve the one or more challenges, and then distributes rewards to the players who successfully complete the one or more challenges. In one embodiment, in step (c), wherein the data collector is a combination of an application program interface and web scraping. In one embodiment, in step (c), the data collector is computer vision.

In another embodiment, the computer vision is configured to identify a change of a state of the live stream in real-time, wherein the state is selected from a plurality of states. In another embodiment, the plurality of states essentially consist of an unknown state, a menu state, a loading state, a warmup state, a deploy state, an in-game state, a gulag state, and a spectator state. In yet another embodiment, the one or more challenges are sent to the players via a communication layer. In one embodiment, the communication layer is an open websocket interface. In one embodiment, data logs of the one or more challenges are stored on a Blockchain. In another embodiment, each challenge of the one or more challenges is provided as a smart contract configured to execute on the Blockchain. In one embodiment, the live stream is any live broadcasted event including sports, live events, and games.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 9 is an exemplary game sequence according to an embodiment of the present invention.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a real-time interactive platform for live streams.

It is to be understood that the terminology used herein is for the purpose of describing particular embodiments only and is not intended to be limiting. The terms "a" or "an," as used herein, are defined as to mean "at least one". The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure. The term "Azarus" in the specification and/or figures is "real-time interactive platform for live streams." The term "platform" or "system" may be used interchangeable throughout. The term "Users" or "End Users" may refer to two types of end users on the platform, including "players", who have signed up at the Azarus platform and can participate in challenges, challenge other players and/or watch Creators' broadcast streams, and "creators", consistently stream their play, build an audience of followers, communicate with their fans, sponsor brands, etc. Selected creators work with Azarus and game publishers and can define and add challenges into their broadcast streams.

Figures 1, 2:
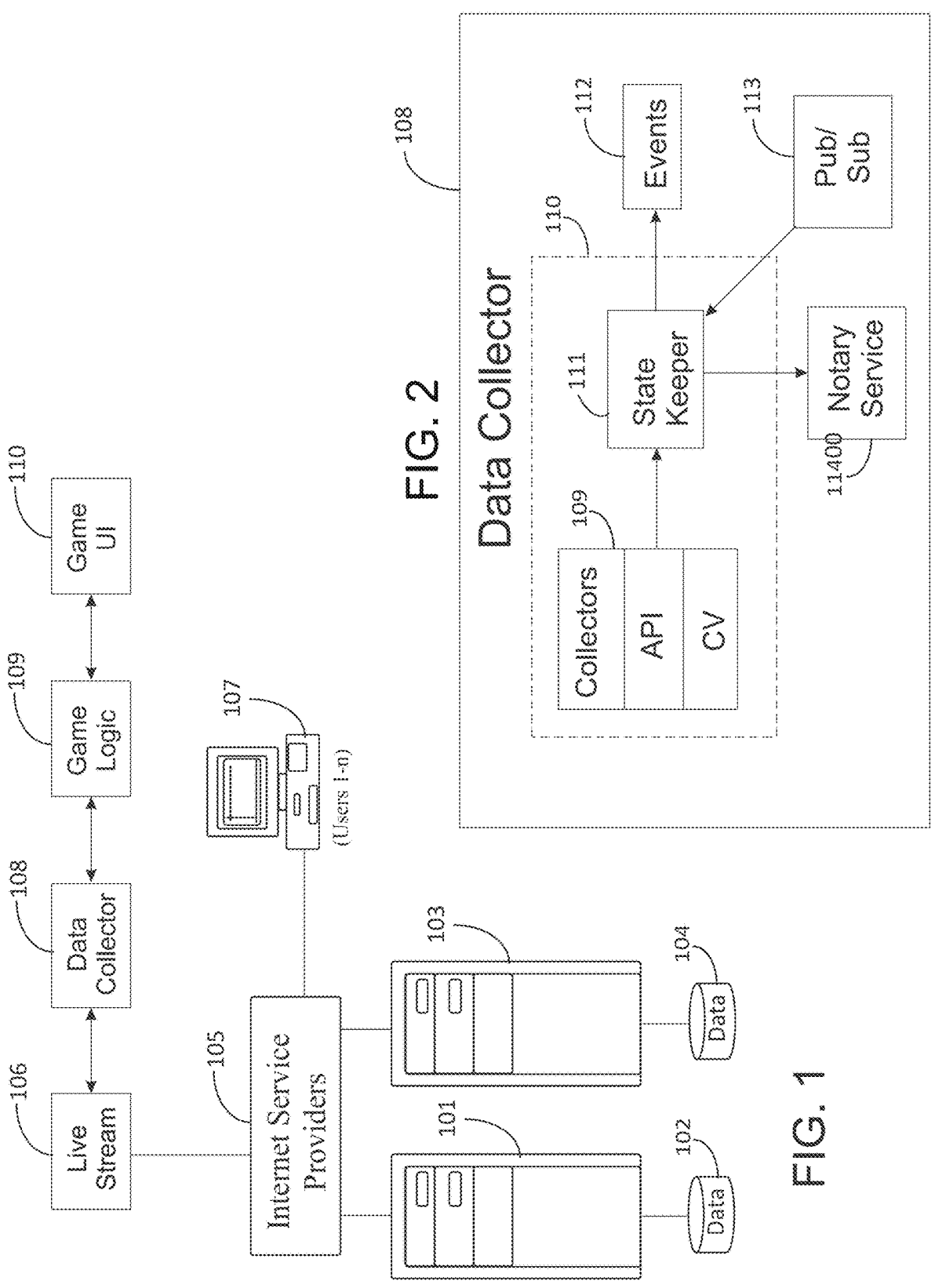
FIG. 1 is a network diagram of the real-time interactive platform for live streams according to an embodiment of the present invention.
FIG. 2 is a detailed diagram of the data collector according to an embodiment of the present invention.

FIG. 1 is a network diagram of the real-time interactive platform for live streams according to an embodiment of the present invention. Referring now to FIG. 1, the real-time interactive platform or Azarus is hosted via at least one server 101 connected to data repository 102. Likewise, an additional server 103 which is configured to host a live stream 106 via an Internet service provider 105 is provided. The additional server 103 may represent multiple servers displaying one or more live streams 106. In some embodiments, the additional server is connected to data repository 104, representing any type of known data storage in the art. As well known in the art, the Internet service provider 105 enables access to the live streams 106 and real time interactive platform of the present invention for a plurality of users 107 via the Internet backbone. In one embodiment, the live stream is any live broadcasted event, including but not limited to sports, live events, games, etc. Sports may include professional sports, such as the NBA, NFL, MLB, etc. as well as amateur sports. Games may include eSports and other video games, including mobile, console, and PC games, as well as other games such as table top games. Anything enabled to be broadcasted live over the Internet should be considered a live stream for the purposes of this disclosure. Each live stream 106 is identified by a unique uniform resource locator (URL), which may also be referred to as a broadcast channel or just channel. Examples of broadcast platforms (additional server 103) include YouTube®, Twitch®, and ESPN®.

In one embodiment, the real-time interactive platform of the present invention is comprised of a data collector 108, game logic 109, and game UI 110. In one embodiment, the data collector 108 is configured to generate timestamped events describing what is happening on the live stream broadcast in real-time. In one embodiment, the game logic 109 is configured to turn the events into gameplay and broadcasts interactions to all the users on the interactive platform. In one embodiment, the game UI 110 is configured to enable the users on the interactive platform to engage on the platform, i.e. enabling the users to play real-time games utilizing the same data on the same channel.

Figure 12:
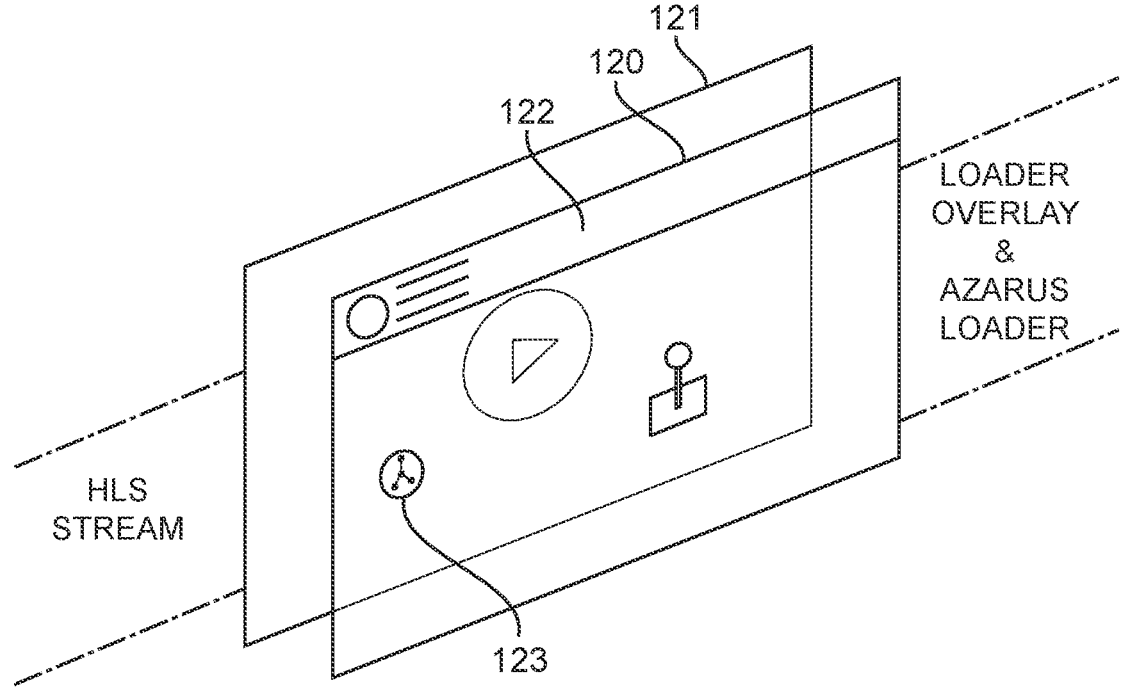
FIG. 12 is an exploded view of the real-time interactive platform on a live stream illustrating the Overlay Launcher according to an embodiment of the present invention.

With reference to FIG. 12, the Azarus front end, available as an overlay extension 120 across various game streaming platforms 121 and browsers as well as a mobile app, encompasses a user-friendly interface, allowing users to sign in and interact with their Azarus platform profiles. This interface, brought forth by an "Overlay Launcher." In one embodiment, the Overlay Launcher is represented as a horizontal bar 122 atop the video or a discrete logo 123 on the screen side, displaying user identity details such as wallet balance of Azarus currency. In one embodiment, the Overlay Launcher seamlessly loads interactive elements onto a layered interface over the video, acting as an "Elements Loader," "Identity Provider," and "User Resources Provider" (e.g., cryptocurrency wallet, digital assets portfolio).

In some embodiments, a client-side "Loader" is introduced, often loaded into the user's browser, availing itself to various means of user interactions or inputs, such as mouse and keyboard inputs, remote control inputs, and touch screen inputs, depending on what inputs are available from the specific user device type.

The "Loader" utilizes web-based technologies and operates in a transparent frame over the video player. In one embodiment, the instantiation of such a frame can be accomplished within the context of the video player using standards like VPAID/VAST and ensuring that the player's implementation allows data persistence and running multiple VPAID frames without pausing the video. In this context, it's possible to entirely command the instantiation of the loader from the encoder with an integration similar to that of a VAST server.

In another embodiment, the instantiation of such a frame can be accomplished externally through the client side browser, using a provided library with access to a frame overlaid to the player as well as context information on the live stream and the ability to capture user inputs. This library could be loaded by the page as a javascript object targeting a Document Object Model (DOM) element hosting the video player, or a browser extension.

Upon loading, the "Loader" establishes and maintains a connection to the Azarus remote backend, awaiting instructions to act on the user's interface (e.g., start apps, show elements, interactive experiences). Apps can be started both manually and automatically on the user's interface. In some embodiments, predicated on the stream's context (e.g., an ad break, app commencement) or timing or remote requests from the production team, the Azarus remote backend dispatches instructions to the "Launcher" to load an app.

The "Loader" avails access to user identity and secure access to user's assets along with standard methods to execute certain actions on the user's behalf (e.g., spend, transfer, receive such assets akin to a blockchain wallet like Metamask) and furnishes standard UX components (spend confirmations, toasts for received items) along with external (email/phone notifications) communication methods with the user.

End users set up their player or creator profiles on the Azarus platform. End users can sign in to the Azarus platform to update their profiles, view other users' profiles, participate in challenges, invite other players to compete in challenges, and view and spend their rewards (denominated in Azarus tokens called AZAs) at various game stores.

In some embodiments, to participate in challenges, end users confirm their agreement (by clicking on a button on the Azarus UI overlaid on a game) to allow Azarus to pull their game statistics from the game provider with whom they have a relationship/identity. This linking of the user identity at the game publisher with an Azarus identity allows the Azarus platform to connect to the game provider and collect information on the player's gaming history, content/media consumption and play behavior. It also allows users to connect to the game publisher's rewards store and exchange Azarus reward tokens (AZA) for game-related rewards. The end user can revoke this consent and linkage with a game publisher at any time, as well as request information on any stored data or ask for the deletion of their Azarus profile data. In some embodiments, creators have additional profile elements such as their gaming identities on the various streaming platforms (Twitch®, YouTube®, etc.).

In one object of the invention, the platform is configured to provide challenges based on the context of a particular game that has been or is being streamed or played. The challenges may be provided by the platform and also by the users. There are several types of challenges, some associated with a broadcast stream (previous or ongoing) while others are for or between players. Some examples include: For streams: An attention challenge: "How many headshots did {{player}} score?" A play challenge: offering viewers the opportunity to earn AZA rewards by playing at least one match a day over a certain period. A prediction challenge:

"How many headshots will {{player}} score?" A trivia challenge: Something unrelated to games such as current affairs, or game-related such as "When was Fortnite® released?" A performance (or creator-versus-player) challenge: A creator records a game performance (e.g., "4 kills with Mira's Shotgun during a match"), and viewers are challenged to replicate or beat it or achieve a certain range of "kills" in a given number of attempts over a specified period of time. For players: A performance challenge: A creator records a game performance (e.g., "4 kills with Mira's Shotgun during a match"), and viewers are challenged to replicate or beat it in a certain number of attempts over a given period of time. A player-versus-player challenge: Pick a friend to challenge in a game with "Who will get the most headshots?". More generally, the platform acts as a "Game Master" which reacts on the context of the stream to trigger interactive experiences on the viewer's interface. Another such example would be making gold nuggets appear over the stream whenever the streamer wins a game, and letting the viewers compete on clicking as many as possible as fast as possible.

Figure 6:
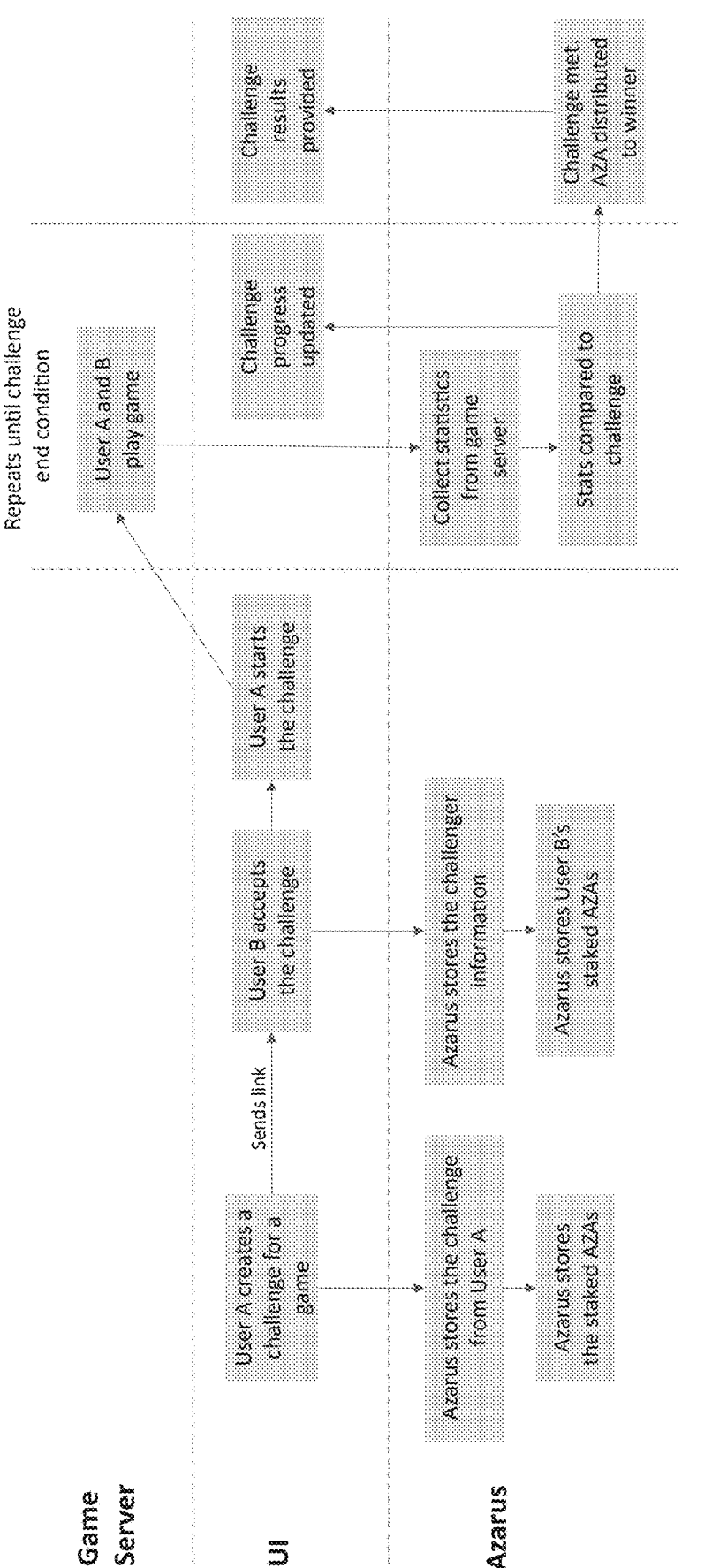
FIG. 6 illustrates a flow diagram showing a sequence for a player versus player challenge according to an embodiment of the present invention.

Various gameplay challenges will now be discussed. Platform generated challenges based on game statistics made available by a game provider with whom it has a relationship, Azarus can construct a database of challenges for a game that can be parameterized by past player histories (e.g., "How many headshots did {{player}} score?"). These can then be inserted as challenges when the games in question are streamed. In some embodiments, Azarus may use AI and natural language processing capabilities to dynamically generate context-aware challenges during a game. Player versus Player challenges, best seen in FIG. 6, shows a typical sequence for a player-versus-player challenge gameplay. A signed-in user can create a challenge (for example, "Who can get the most headshots?" for a particular game in a particular number of tries in a given time period) on the Azarus platform and send the challenge link to a friend, a follower, a previously selected player, or broadcasts it to a group. When the challenge is accepted, Azarus stores the challenge information (the terms of the challenge, the participants, the staked AZAs), monitors the game statistics and continuously checks if the challenge conditions have been met. If the conditions that resolve the challenge are met before the time period set by the challenge expires, the winner is declared and receives the staked AZAs.

Creator challenges are based on criteria such as their skills, number of followers, etc., game publishers and Azarus can enter into a tripartite arrangement with creators. Selected creators are given the opportunity to create their own challenges using templates provided by the Azarus platform that allow them to create challenges related to their game performance or content. Azarus provides a portal for creators and the tools for creating challenges for various games.

For each supported game or live stream, Azarus starts by defining a dictionary that describes each data point the game publisher makes available (e.g., r6s_headshots="kills with a single bullet in the head"). In one embodiment, each data point is read through a publisher-provided API in the cloud, through a game-client API integration, through Computer Vision, or any other means that enables access to real-time or pseudo real-time data. Using this dictionary, Azarus creates a library of challenges for the different types of challenges (e.g., attention, prediction, etc.) as previously described. This library can be expanded, by allowing parameterization applicable to a gaming or streaming context and leveraging the stats of the current game (or past history). The challenges chosen from the library are adapted for a given gaming or streaming session to take into account the player or creator's past activities. For example, a given type of challenge, for example an attention challenge such as "How many headshots did [[player]] get in the previous game?", can have the range of possible answers (e.g., "0-3, 4-6, . . . etc.") adapted based on the player's past history. Or, the number of headshots to win a reward in a performance challenge can be varied depending on the skill level of a player.

The challenge design also covers: what and how many data points to observe; when enough data has been collected to resolve the winner of the challenge; how to give a score to participants (which will serve to populate a leaderboard); what stakes are needed for participating in the challenge; and how to define the winners and the prize distribution mechanism.

In some embodiments, Azarus automatically classifies challenges based on difficulty by measuring user success, as well as allowing players to report or suggest tweaks to existing challenges for any mistakes or ambiguities in the design. As challenges are often created using the textual description from stats, there is the possibility of ambiguity or nuance, for example, a "headshot" may not be uniformly understood by players as a kill with a single shot to the head and some players might count wounding grievously as equivalent. Such misunderstandings can lead to poorer scores and rankings. Further, in some embodiments, software development kits are created, enabling any third party such as publishers, streamers or even players the ability to create challenges through coding or visual coding.

Figure 10:
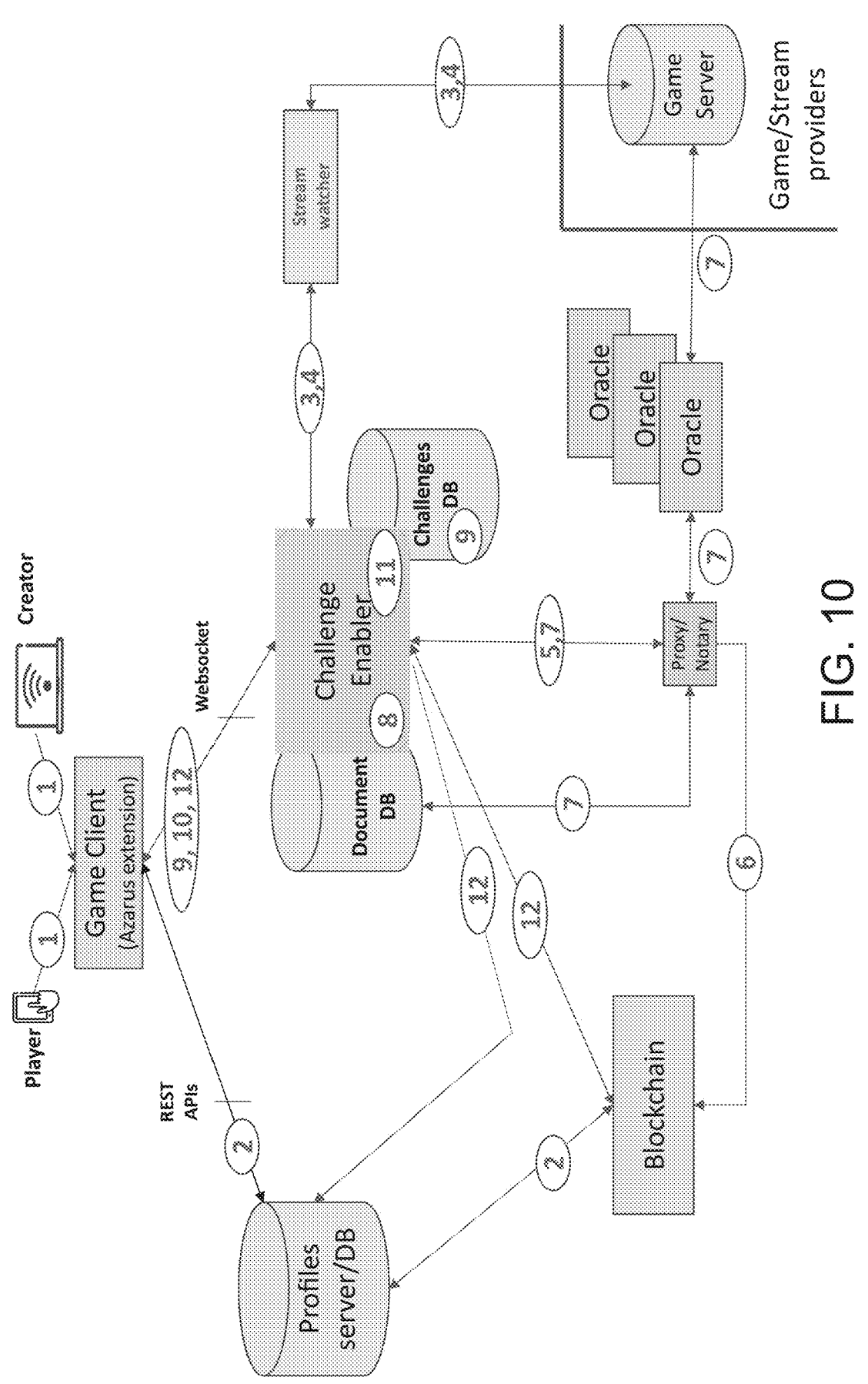
FIG. 10 is an interactive flow diagram according to an embodiment of the present invention.
Figure 11:
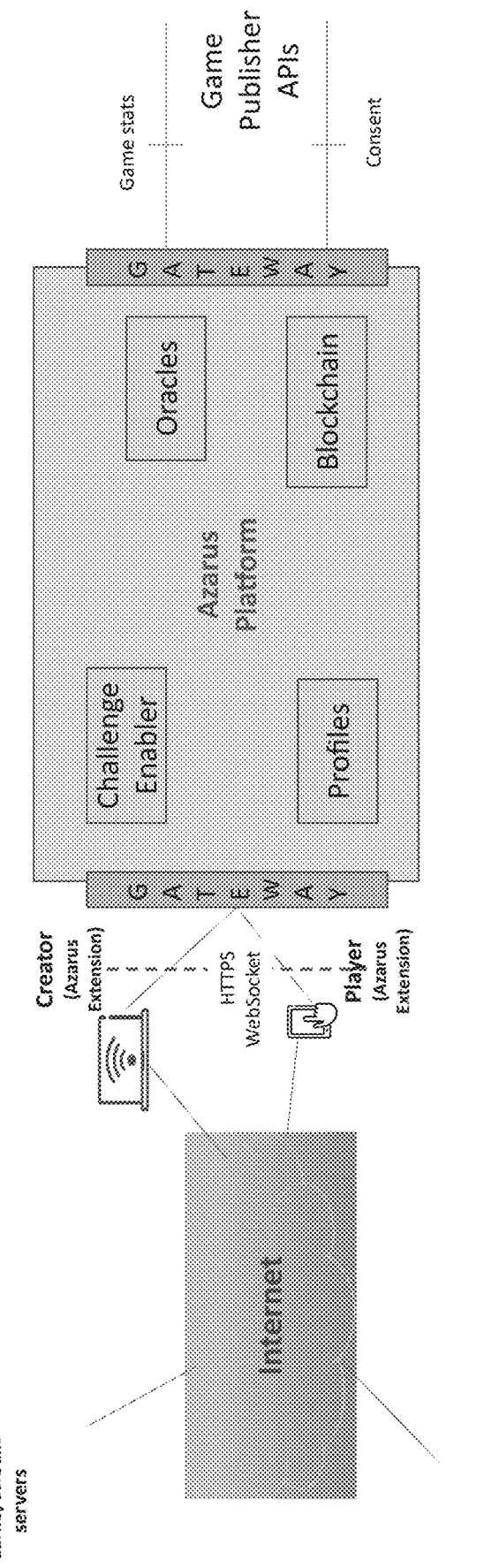
FIG. 11 is a network diagram of the real-time interactive platform for live streams according to an embodiment of the present invention.

The creation of interactive challenges is a particular advantage of the present invention, and a challenge engine creates and sequences these challenges for a gaming or streaming session. Based on the statistics data that each game publisher makes available, Azarus builds a dictionary of events for a particular game (e.g., "r6s_headshots="kills with a single bullet in the head"). Using such events, Azarus creates a library of the different types of challenges previously described. In one embodiment, the challenge enabler creates a sequence of challenges, a Game Sequence, as shown in FIG. 10. The challenge enabler will be described in greater detail below.

In one embodiment, the challenge enabler is a critical part of the platform, as the challenge enabler creates challenges within the context of a streaming or gaming session, sequences and schedules these challenges during the lifetime of the session, invites players to participate in the challenges, monitors the session for data that can resolve the challenges and then distributes the appropriate rewards.

In another embodiment, the challenge enabler is an engine configured to turn information about live stream status and events into gameplay interactions. The interactions are limitless, and the examples provided are just a few instances of possible interactions. For example, in one embodiment, the challenge enabler can produce a "click to claim" interaction for the users, wherein the users have to click on a virtual item on the screen after or during an event. For instance, the challenge enabler may trigger a plurality of gold nuggets "raining" from the top of the screen when the creator does a headshot, and all viewers/users would have to click on the nuggets to collect. Again, it should be understood that this is one example of an interaction.

When scheduling challenges, for each player, Azarus maintains a context of whether the player is streaming (i.e., is a creator) or just playing by himself or with another player. Generation of challenges depend on this context. i.e. if the challenge is expected to be broadcast to viewers of the player's streams, Azarus generates steamer challenges, otherwise these are player challenges.

In one embodiment, the challenges are adapted for a given gaming or streaming session, taking into account the player or creator's past activities, and other factors such as how frequently the challenge (or a similar one) might have been issued. A given type of challenge, for example an attention challenge such as "How many headshots did [[player]] get in the previous game?" can have the range of results (e.g., "0-3, 4-6, . . . etc.") adapted based on the player's past history.

In one embodiment, apps operate on a "Schedule," derived from a playlist of available apps. Each app is designated with a run frequency and a specified duration—either limited by time or unlimited, requiring a trigger for termination.

In some embodiments, triggers can be categorized into three types: 1) Time-based, 2) Event-based, driven by programmatic data such as stream context changes or external data, and 3) Manual, initiated by user actions.

On each active channel, based on the channel's playlist, a scheduler in one embodiment orchestrates a timetable of apps utilizing time-based triggers. In some embodiments, event-based and manual triggers override time-based schedules, necessitating a rescheduling. Upon the occurrence of each trigger, a Remote Multiplayer server transmits instructions to a user interface array via the "Launcher," initiating app or displaying graphical elements.

In a further embodiment, upon notification from a stream watcher regarding an active creator on a stream, or the initiation of a game involving a challenge by one or more players, a challenge enabler arranges a suitable game sequence or interaction for execution on the stream or gaming session. Essentially, the challenge enabler operates as a "Game Master" for all viewers, managing game progression based on inputs derived from the creator's gameplay.

As illustrated in FIG. 9, in one embodiment, game sequences are activated by an event on the stream or game, as signaled by a game oracle. Scheduling can be either time or event-based, for instance, a next trigger set "in 5 minutes" or "when the players conclude the next round." In some embodiments, every time the challenge enabler acquires new stats, it generates and schedules a new, relevant game sequence for the game/session based on the context.

Advantageously, the challenge enabler front end facing Azarus game clients is built to handle a high volume of real-time traffic, necessary to broadcast challenges over many individual WebSockets to web clients as well as handle any time-sensitive responses to challenges. As players enter a challenge, their participation is recorded by the challenge enabler. There is, depending on the challenge's design, a limited time window for "joining" a challenge. When the join timer expires, the challenge is cancelled if there are no entries. Otherwise, the challenge enabler starts to continuously monitor the game stats received from the (game/stream specific) oracle to determine if the challenge can be resolved, or until the challenge completion timeout is reached. In one embodiment, the websocket is used as a RPC (remote procedure call) & RRPC (revert remote procedure call layer), wherein the challenge enable is configured to "puppeteer" the UI in front of the eyes of all viewers, and they can interact with the game through RRPC calls.

In one embodiment, the challenge enabler receives its game statistics data from an oracle, as proxied by the notary, which timestamps the data. In one embodiment, the notary/ proxy interfaces to the oracle, the Blockchain, and the challenge enabler. The interface to the oracle is a message service bus to which the oracle publishes game stats. The notary pulls this data off the message queue, time stamps it, verifies if there is a subscription for this data, and, if so, sends it to the challenge enabler, also over a message service bus. Prior to sending any game-related stats to the challenge enabler, the proxy checks with the Blockchain to ensure that the end user has given permission to allow game-related stats to be pulled from the game publisher. If such permission is absent, or has been revoked, the data is not pulled and the challenge enabler informed.

When sufficient data, as defined by the challenge design, has been collected to resolve the challenge, the challenge enabler determines the final result, creates win-lose states of the participants and distributes the rewards or stakes (if any) as appropriate. The results are pushed to the participating players.

In some embodiments, logs of the challenges are stored on Blockchain to show what data was used to get to the result. In some embodiments, the challenges are programmatic smart contracts that will execute on the Blockchain with all the benefits (e.g., full transparency, auditable, etc.) that smart contracts on a Blockchain provide.

In some embodiments, the challenge engine maintains a state machine for each challenge, which progresses through the following states: New: challenge broadcast to viewers; Open: awaiting participants, each placing appropriate stakes (if required); Pending: awaiting challenge resolution (no new players can join); Resolved: challenge result determined; and, Closed: AZA stakes distributed, as appropriate. In some embodiments, the challenge enabler uses several databases to record its activities, including but not limited to a documents database and a challenges database. In one embodiment, the documents database serves as a storehouse of all challenges and game sequences created/scheduled for a given stream, game, or player. The documents database also contains the watchlist for all creators known to the system, and updates their streaming status with the game being played as received from an oracle. In one embodiment, the challenges database keeps the updated state of any current challenge available to end users, the participants that have accepted the challenge, and the relevant statistics pertaining to the active challenges for the game being played or watched.

FIG. 2 is a detailed diagram of the data collector 108 within an oracle 110 according to an embodiment of the present invention. Referring now to FIGS. 1-2, the data collector 108 is configured to generate events from API/web scraping and computer vision 109. In one embodiment, the data collector 108 receives a subscription request from the game logic 109, wherein a stream monitor subsystem determines the data source to observe based on the type of content on the live stream and the eventual data on the channel's host/creator. In one embodiment, as a subscription is active, the data collector 108 pushes events 112 to a pub/sub channel 113 with any change in the state of the broadcast content, including full state information pre- and post-change via the state keeper 111. For instance, during live stream broadcast of a League of Legends game, the data collector 108 will send updates of the game progression from GAME_START to GAME_END and noting changes in GOLD_BALANCE, KILLS, TOWER_HITs, and other key actions from the game in-between.

The notary service 114, for every channel observed, the data collector 108 keeps a state describing the known status for the game in progress. When new information is acquired, it's compared to the known state to define if a change has occurred, and records that change and propagates it to subscribers. This will be described in greater detail below.

The invention includes a pattern to keep track of user actions and ensure data integrity, and that data is archived in an efficient and verifiable manner. Using a distributed cloud storage, for instance the InterPlanetary File System (IPFS), interaction logs are stored anonymously in a cryptographical ledger, with the hash archived along with the final transaction attached to the app sessions' asset distribution "transaction". The transaction is executed on an open, transparent and verifiable environment such as a blockchain—or more specifically an "application-specific chain". The app events are collected through a third-party service that connects smart contracts with the outside world, primarily to feed information in from the world, but also the reverse, and kept off chain on distributed high speed storage. This is known as an Oracle, or an entity used by a system to obtain information from an external entity. In this architecture, an Oracle is used to interface to a live stream (hosted by a server). It is used to obtain statistics for a particular live stream. There is a separate Oracle for each game or stream associated with a player or creator, respectively. The app mechanics are executed on Oracles who subscribe to the relevant datastream (read-only). Oracles can finalize a session through the submission of the relevant interaction proofs and consensus.

In one embodiment, the API/web scraping collector 109 uses player information to access live stream progression data through an API. APIs can be public or private. Some live streams do not have an API but expose data through dedicated web portals, which can be scraped through similar methods. For each live stream, a dedicated connector must be implemented to support the chosen API access method. This method is limited by the amount and quality of the data exposed. Experience shows that the endpoints are not kept up to date as well as they should by the creators.

Figures 3, 4:
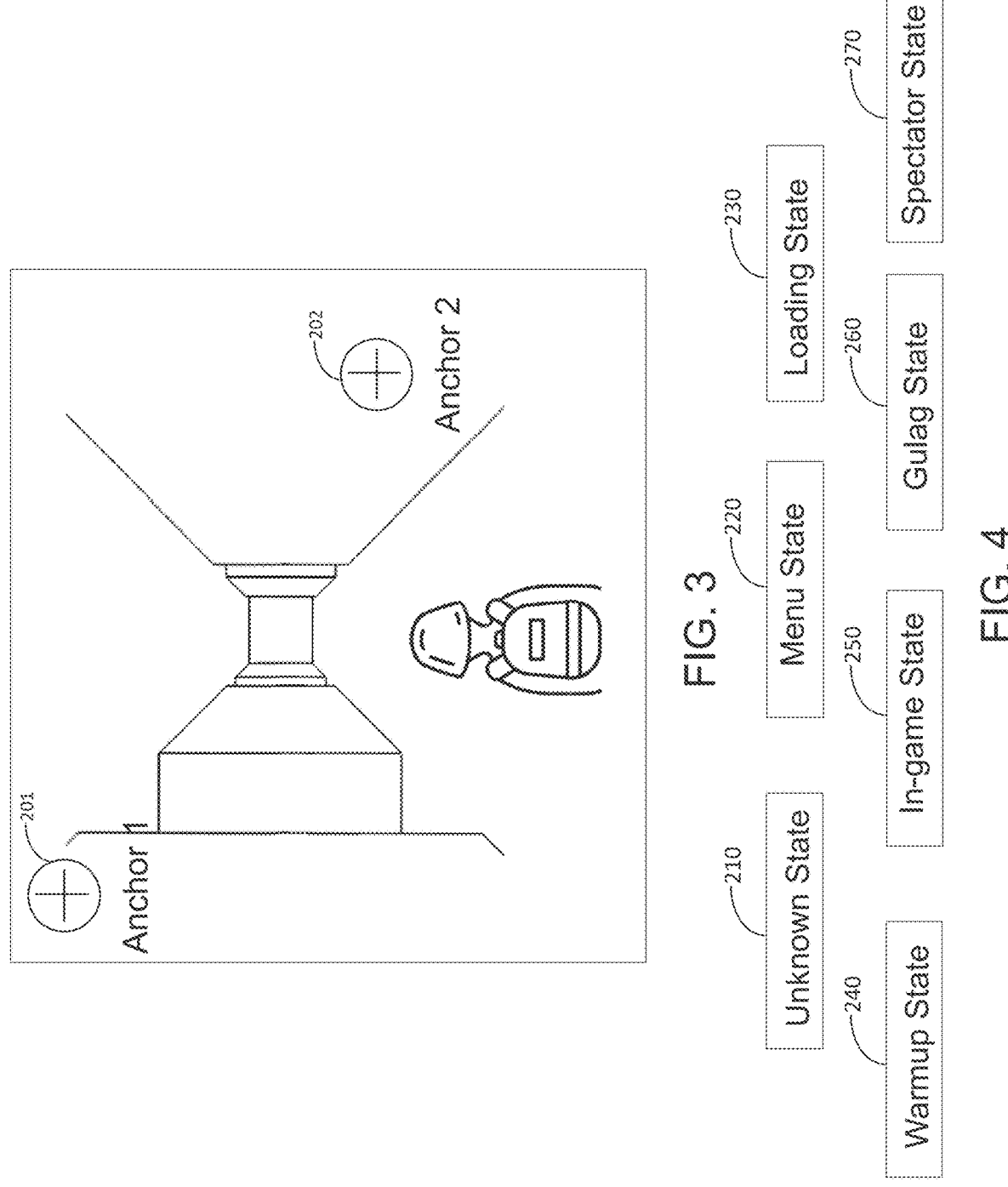
FIG. 3 is an exemplary game for use with computer vision according to an embodiment of the present invention.
FIG. 4 is a diagram showing various computer vision states according to an embodiment of the present invention.
Figure 5:
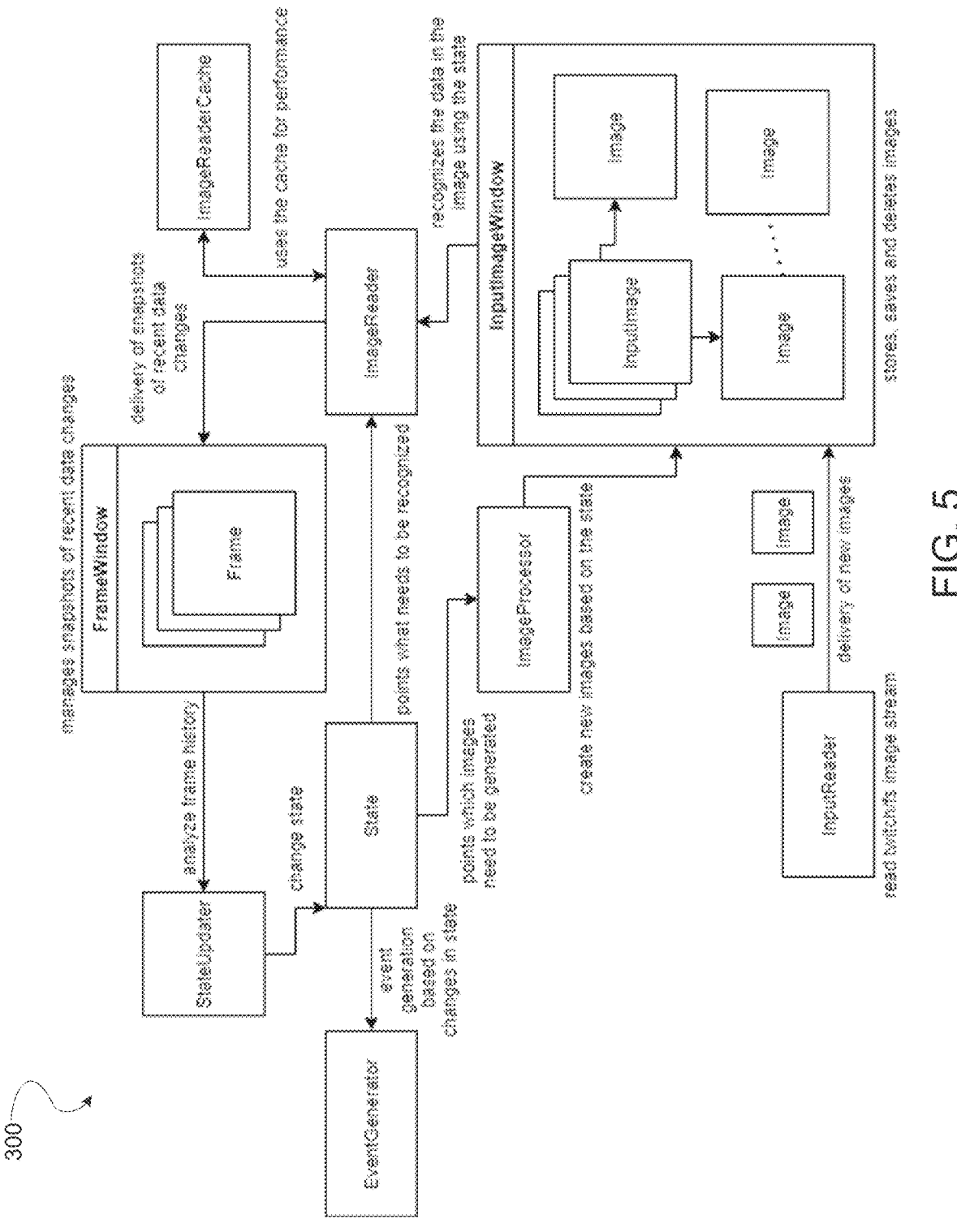
FIG. 5 is flow diagram showing an engineering approach configured to work in conjunction with the computer vision according to an embodiment of the present invention.

FIGS. 3-5 are various views and diagrams related to the use of computer vision according to an embodiment of the present invention. Referring now to FIG. 3, an exemplary screen view of a live stream is displayed. In this particular stream, a first person game is shown, however as previously mentioned any type of live stream may be utilized for the present invention. In the exemplary view/image, displayed context information is provided through HUD (heads-up display/overlays. In one embodiment, for each type of overlay, the system identifies at least two static artifacts of the image, which enables the system to define anchor points 201, 202 enabling the extraction of the active game/view window from the broadcast. In some embodiments, stream creators will include the game/stream inside an overlay of their own.

In some embodiments, after extracting the game/view image of the broadcast image/view, the system identifies the apparition of textual or graphical content in specific positions based on predefined knowledge of the current state. In some embodiments, Computer Vision and/or OCR is used for text content or image matching. Then, the image is tagged and the new tags are sent to the state keeper 111 (FIG. 2) which decides whether the state has changed and emits events. This approach allows the real-time interactive platform of the present invention to go live as it is for any game/event desired. In some embodiments, to make this process more efficient, the tagged images generated through this approach are to an engineering approach system 300 shown in FIG. 5. Advantageously, a trained system would be less sensitive to the image quality of the stream and faster are processing the images. It should be understood that the collectors and state keepers are specific to each game/stream and the notary service and pub/sub are common to all Oracles.

Referring now to FIG. 4, the computer vision recognizes a change of state and defines what the system looks for in the new state, which may generate an event. In an unknown state 210, the computer vision system does not filter what it is looking for. When it recognizes a state change the system goes to the correct state. For example, when the computer vision system locates or "sees" the menu button, the system goes to the menu state 220. When the system finds a loading screen, the system goes to the loading state 230. When the system finds a warm up timer, the system goes to the warmup state 240. When the system finds people, icons, or other elements indicative that a game is happening, the system goes to the in-game state 250. In some embodiments, when the system finds a player1 vs player2 banner, the system goes to the Gulag state 260. It should be understood that this state is specific to a predetermined list of games that have a gulag state. Further, it should be understood that these states described herein are merely some examples of states, and the number and name of each state may change depending on the content of the live stream, i.e. game, or sporting event. Still in the unknown state 201, in one embodiment, when the system finds a spectator icon, the system goes to the spectator state 270. In each specific state, the system looks for specific things that would trigger a state change. In one embodiment, in the menu state 220, the system looks for loading screens, warmup timers, or deploy banners (in-game icons), and when it finds these specific things, the system will go to the appropriate state. In one embodiment, in the loading state 230, the system looks for menu icons, warmup timers, or a deploy banner (in-game icons). In one embodiment, in the warmup state 240, the system looks for menu icons or a deploy banner (in game icons). In one embodiment, in the in-game state (or deploy state) 250, the system looks for menu icons, gulag banners, or spectator icons. In one embodiment, in the gulag state 260, the system looks for menu icons, in-game icons, or spectator icons. In one embodiment, in the spectator state 270, the system looks for menu icons, or in-game icons. Advantageously, the system filters what it is looking for in each state, making the system more efficient in finding visual clues to facilitate a state change. In some embodiments, the change of state generates an event. In some embodiments, events are generated within a given state. In another embodiment, annotated footage is used for deep learning training of a system to automatically extract information from a live stream. Through deep learning, the system can train the network to extract the HUD from the game on its first layers then identify HUD's content on the external layers. Advantageously, the learning will provide us with a first set of layers that should work with any game so we can add new games by only re-training the outside layers.

Figure 7:
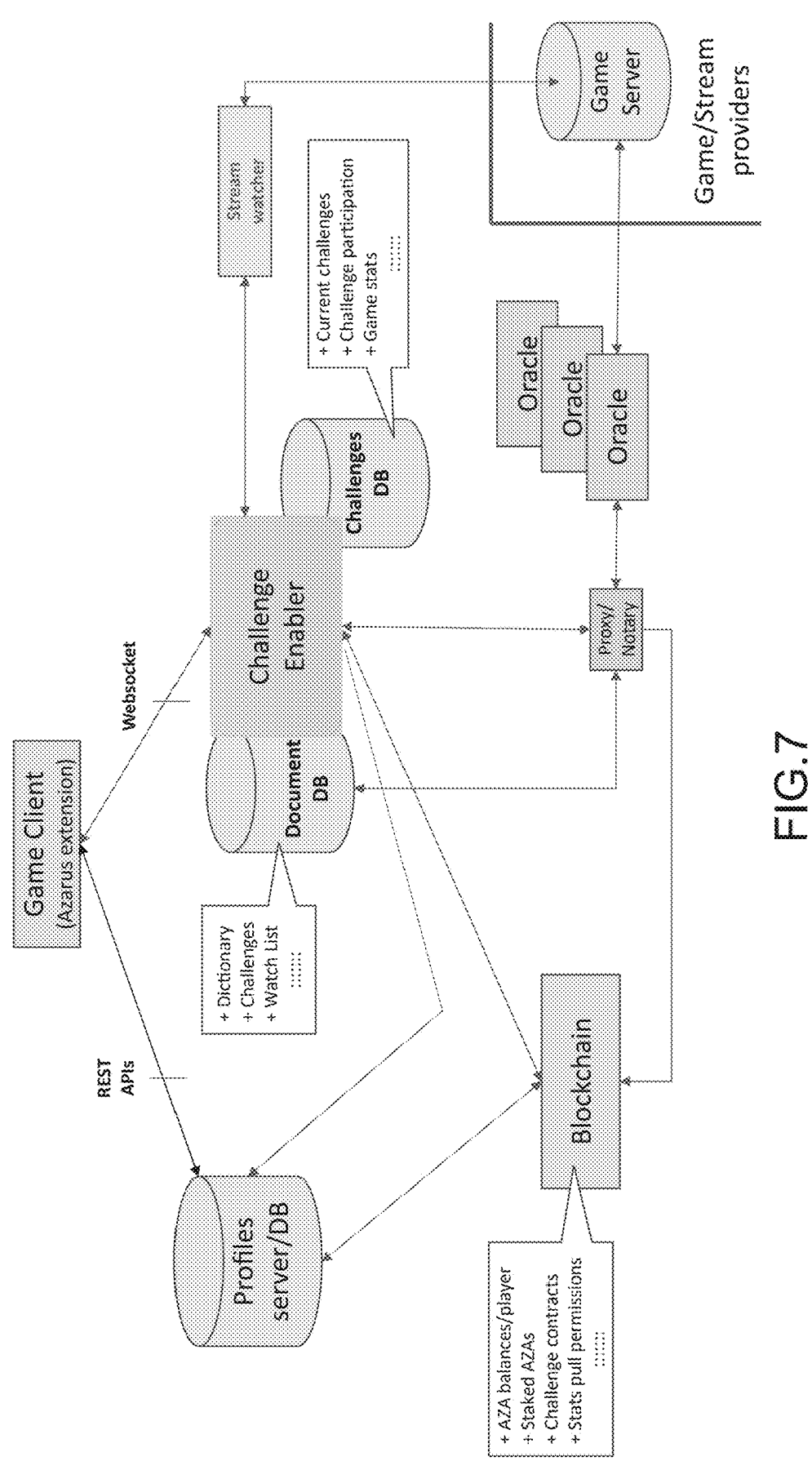
FIG. 7 is an architectural diagram of the real-time interactive platform for live streams according to an embodiment of the present invention.

FIG. 7 is an architectural diagram of the real-time interactive platform for live streams according to an embodiment of the present invention. Referring now to FIG. 7, a "stream watcher" is an entity that camps on a game or stream server and watches for events related to a known creator or player. When the creator goes live or the player starts a game as a part of a challenge, the stream watcher informs the "challenge enabler", and likewise when the relevant session ends. In some embodiments, there are different stream watchers for creators on each of the streaming platforms they use and for game publishers to support players participating in game-based challenges.

Figure 8:
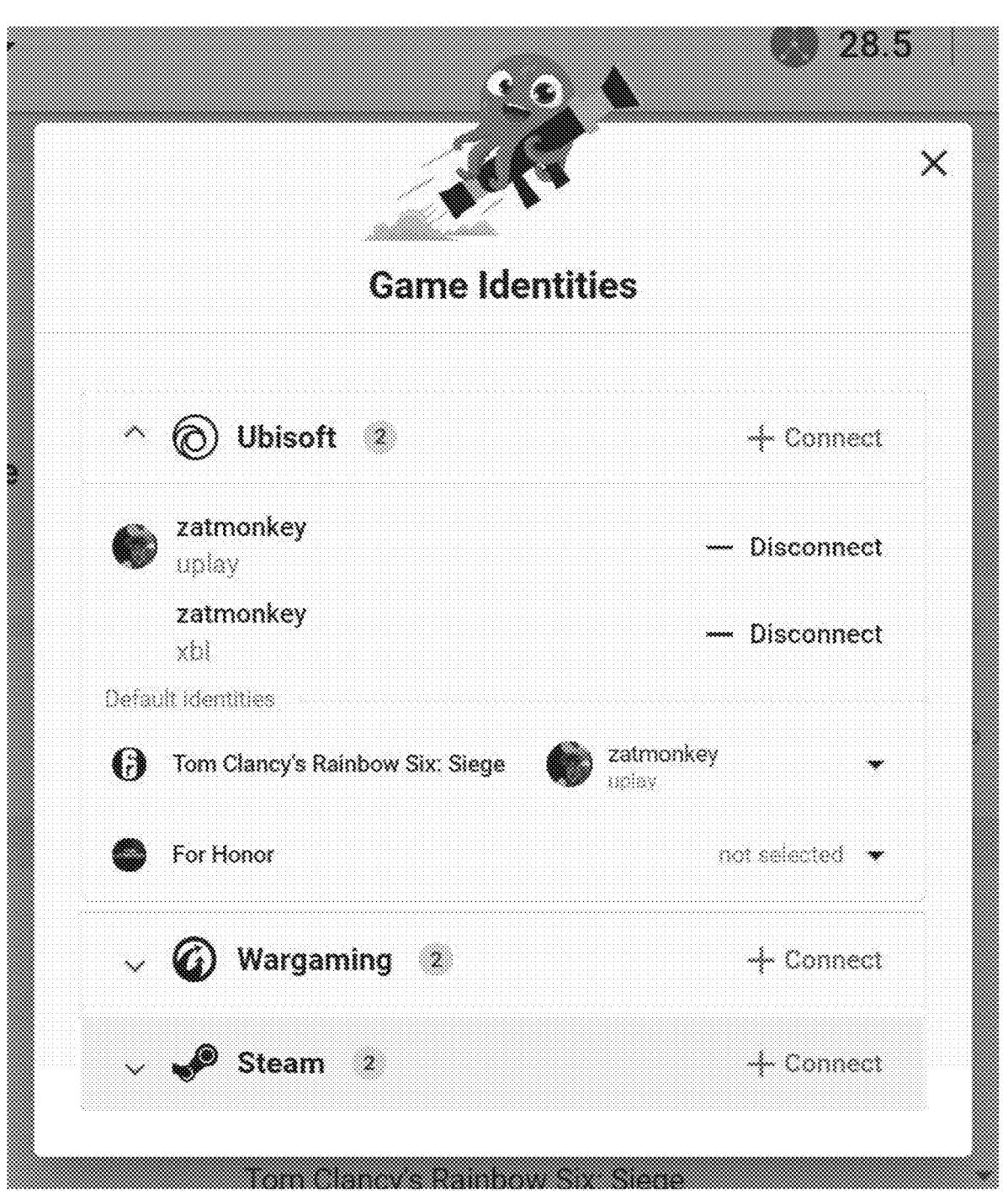
FIG. 8 is a user interface illustrating user permissions according to an embodiment of the present invention.

The Azarus game client is an overlay extension on most game streaming platforms, several browsers or available as a mobile app. The game client has a REST API to a profiles server/database over which users can sign in to the Azarus platform, link their Azarus identity to their identities at game providers, update their profiles, view other users' profiles, participate in challenges, invite other players to compete in challenges, and view and spend their rewards (denominated in Azarus tokens called AZAs) at various game stores. End users (players/creators) give consent to have their (respectively, play/streams) monitored for game stats by using the Azarus extension. An authenticated (to Azarus) user will explicitly give consent by allowing Azarus to link his game identity to Azarus. In FIG. 8, for example, the user has given consent to access game statistics for two games from Ubisoft but withheld that permission from For Honor by not connecting those game identities.

In one embodiment, the game client has a communication layer, Web Socket interface, which is a standard two-way communications channel for real-time data transfer to a high throughput endpoint connected at its backend to the challenge enabler server and its associated databases. This high throughput websocket interface is used by the challenge enabler server to send challenges and status updates on ongoing challenges to a game client as well as receive end user challenge requests and responses.

The profiles server/database entity stores an end user's Azarus profile, their Azarus identity, their linked-to identities at various game providers, game histories, their AZA rewards points and achievement badges. Creators have additional parameters such as their streaming identities at various stream providers. The Profiles database is viewed/updated by the end user using REST APIs at the game client. A player's game history, badges, AZA points, etc. can only be changed by Azarus and updated through an interface to the Blockchain, where a user's AZA points are stored; an interface to the challenge enabler, which maintains a record of the player's game history.

The Blockchain is used as a repository which, by its design, provides an auditable and immutable trail of certain critical data affecting end users. These include: Storage of challenges placed during a streaming or gaming session, including details of participants, criteria for selecting the winner(s), staked AZAs, etc.; Game stats received during a streaming/gaming session; An end user's current AZA balance; Storing the user consent that allows the linking of a user's Azarus identity to a game identity for purposes of pulling game stats. In some embodiments, the Blockchain interfaces to the profiles server, to store user consent for pulling game stats and to provide it with user-specific data (such as a user's AZA balance) for updating the use profile; the notary/proxy, to enable it to verify if the user has given consent for game stats to be pulled; and a game publisher, to distribute and keep in sync the state of the user consent between Azarus and the game publisher.

When a challenge starts, the challenge enabler instructs the (appropriate) Oracle to watch a particular game or creator stream and report back game statistics at certain intervals. Depending on the game publisher, the Oracle either polls the game server or has data pushed to it from the latter. The Oracle publishes any received data to a message service bus, to which the challenge enabler (via the notary/proxy) subscribes.

The Oracle also interfaces to the documents database to add a creator to a watchlist when the creator "goes live" (i.e., starts streaming). As the oracle has the knowledge specific to the game it connects to, it knows what those stats mean and how to turn them into challenges. For example, the R6S Oracle knows about "headshots" and can use that datapoint to create an attention question "How many headshots were made?", a prediction challenge "How many headshots will be made?", or a play challenge "Can you do more than [xx] headshots?" or "Who can make the most headshots?". Such game-specific challenges can be fed to the Challenge Enabler.

In some embodiments, the oracle is configured to generate challenges programmatically using Natural Language Processing. Each oracle will be provisioned with a textual description of each stat as well as URLs to online game fan portals. Using those pointers, the oracle will be able to crawl sites for game lore and history and generate new challenges (e.g., attention, prediction, trivia and more in the future). Those websites also have records of eSports performance that can be used to trigger play challenges such as "During the 2nd match of the R6S finale, Pengu managed to do a perfect round with Tachanka in the Throne Room. Can you repeat his performance?"

Advantageously, the real-time interactive platform is configured to run multiple overlay games simultaneously on multiple (channel, game) pairs. In one embodiment, for each overlay game, a specific game logic must be defined which describes how overlay games are operated based on the context of the live stream through a set of rules using simple logic and time schedulers. For example, in a live stream of League of Legends, if the creator does a "pentakill", and the last event question was greater than 5 minutes prior, the system then generates questions randomly picked from this set, such as "Who was the first kill?" or "Who was the last kill?" These questions may be considered "easy" on the difficultly scale. Next, the system may generate "medium" difficultly questions, such as "Who was the 2nd/3rd/4th kill?" In one embodiment, the game logic decides which viewers/spectators get each specific question. In some embodiments, the game logic also keeps the state of each player in the context of the overlay game played. Some games may restart on each stream, some may compound over time and over channels.

In some embodiments, the stream watcher is configured to verify if a channel is currently broadcasting and should be watched by the data collector 108. In some embodiments, the game logic also includes a standardized communication later enabling real-time connection to all the game clients on the viewer side. As previously mentioned, in one embodiment, the communication layer is WebSockets and offers a scalable pub/sub mechanism. In some embodiments, correction layers are added to take into account clock offsets on the client-side as well as stream delays on the platform, all that to enable an experience as synchronous as possible between the overlay game and the subjacent streamed content.

In one embodiment, the game client is fully controlled by the game logic. States are changed as needed while user inputs are collected and transmitted to the game logic which defines the resulting state. Clients show up above the live stream through the use of overlay technology, such as Chrome® extensions, Twitch® extensions or other SDKs. However the means, the overlay game is provided as a web app over the feed. The game client provides context of the channel currently watched and the identity of the viewer.

Referring now to FIG. 10, an interactive flow diagram of typical gameplay is described. For this exemplary gameplay, we have chosen a scenario where a player watches a creator streaming session and responds to a generated challenge.

The numbered steps identified in FIG. 10, the interaction flow between the components during gameplay are described below:

Pre-Conditions Before Gameplay:

1. Both the player and creator, interacting via the Azarus extension on their browsers, give permission to link their game identities (for a specific game/stream respectively) to their previously authenticated Azarus identities.
2. This permission—which gives Azarus permission to monitor the game/stream for stats—is received by the Profiles server over the REST API and stored in the Blockchain.
3. The challenge enabler asks the stream watcher to monitor a particular creator for activity on a specific streaming channel (using that creator's identity on that stream).

During Gameplay:

4. When the stream watcher notices that the creator has become active on the specified stream, it notifies the challenge enabler.
5. Proxied by the notary/proxy, the challenge enabler subscribes to creator's game stats for the particular stream from the Oracle.
6. Prior to fulfilling the subscription request, the notary/proxy verifies with the Blockchain if the creator has consented to have such stats pulled from the game publisher.
7. Assuming it is permitted, the notary/proxy subscribes to receive the requested stats from the oracle and continuously forwards any data received from the game server to the challenge enabler. The watchlist in the documents database is also updated with the creator/stream identity. Meanwhile, the oracle periodically polls or pulls game stats from the game server.
8. The challenge engine in the challenge enabler creates an appropriate game sequence. In this example, we'll follow only the first challenge in such a sequence.
9. The challenge is sent to all active players who are watching the stream via an open websocket interface. The list of players to whom the challenge is sent and any staked AZAs required by the challenge are stored in the challenges database.
10. The websocket is monitored for responses until the timer for the challenge expires.
11. The challenge enabler has been monitoring the received game stats throughout and, upon the challenge timer expiry and depending on the nature of the challenge, is able to determine the winner(s) based on the received stats, past history, etc.
12. The challenge enabler informs all players about the correct answer via the websocket interface, distributes the staked AZAs as appropriate among the winner(s) and stores the result on the Blockchain. It also updates the profiles database so that end users can view the results.

Steps 8 through 12 are repeated for the remaining challenges in the game sequence, or until the creator stops streaming.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

For instance, in some embodiments, the real-time interactive platform provides a betting challenge, wherein the real-time interactive platform provides instant micro bets during a live stream broadcast enabling users to bet on specific outcomes in real-time. For example, "will the creator score a 3-pointer in the next 20 seconds?" The system may provide this because it is configured to track in real time what is happening on the live stream feed, and is configured to generate and resolve bets at scale.

In addition, reference to "first," "second," "third," and etc. members throughout the disclosure (and in particular, claims) are not used to show a serial or numerical limitation but instead are used to distinguish or identify the various members of the group.

What is claimed is:

1. A method for providing a real-time interactive platform for live streams, the method comprising steps:

(a) providing a server having a hardware processor connected to a data repository, the server configured to initiate and host an overlay application as a layer incorporated on top of a video player broadcasting a live stream, wherein the overlay application is within the video player itself via an overlay method selected from the group of: a Video Player Ad Interface (VPAID) script and a Video Ad Serving Template (VAST) scrip, or externally through an internet browser extension or JavaScript Document Object Model (DOM), wherein the overlay application may be hosted on any platform enabled to broadcast live via the Internet and visibly accessible to any viewer of the live stream, and the overlay application providing the real-time interactive platform for a plurality of users; wherein the overlay application comprises an Overlay Launcher comprised as a horizontal bar atop the video player or a logo on a portion of the live stream;

(b) executing an Overlay Loader when the Overlay Launcher is engaged via a user input directly on the Overlay Launcher, wherein the Overlay Loader provides a user interface for the overlay application that enables a user of the plurality of users to interact with the overlay application via an input method selected from mouse and keyboard, remote control, and touch screen, enabling user access to the real-time interactive platform through a multitude of electronic device types;

(c) launching a session within the overlay application, either manually based on timing or remote requests from a production team or automatically based on context of the live stream, connecting the user of the plurality of users to a room where other users interacting with the session are grouped and allowing the user of the plurality of users and the other users to play together;

(d) providing a data collector within an oracle, wherein the oracle is configured to interface the live stream to obtain statistics from the live stream;

(e) generating timestamped events, via the data collector, wherein the timestamped events described what is occurring on the live stream in real-time; and, (f) turning the timestamped events into gameplay interactions, via a game logic algorithm, for the plurality of users; and, (g) enabling the plurality of users to interact with the real-time interactive platform via clicking on the overlay application, to create and participate in challenges.

2. The method of claim 1, wherein the plurality of users are end users on the interactive platform including players and creators.

3. The method of claim 2, wherein in step (d), a challenge enabler creates one or more challenges within the context of the live stream based on real-time information from the live stream captured by the oracle.

4. The method of claim 3, wherein the challenge enabler further schedules the one or more challenges, invites the players to participate in the one or more challenges, monitors for data that can resolve the one or more challenges, and then distributes rewards to the players who successfully complete the one or more challenges.

5. The method of claim 1, wherein in step (c), wherein the data collector is a combination of an application program interface and web scraping.

6. The method of claim 1, wherein in step (c), the data collector is computer vision.

7. The method of claim 6, wherein the computer vision is configured to identify a change of a state of the live stream in real-time, wherein the state is selected from a plurality of states.

8. The method of claim 7, wherein the plurality of states essentially consist of an unknown state, a menu state, a loading state, a warmup state, a deploy state, an in-game state, a gulag state, and a spectator state.

9. The method of claim 4, wherein the one or more challenges are sent to the players via a communication layer.

10. The method of claim 9, wherein the communication layer is an open websocket interface.

11. The method of claim 4, wherein data logs of the one or more challenges are stored on a Blockchain.

12. The method of claim 11, wherein each challenge of the one or more challenges is provided as a smart contract configured to execute on the Blockchain.

13. The method of claim 1, wherein the live stream is any live broadcasted event including sports, live events, and games.

\* \* \* \* \*